US011054699B2

(12) United States Patent
Koo et al.

(10) Patent No.: US 11,054,699 B2
(45) Date of Patent: Jul. 6, 2021

(54) DISPLAY APPARATUS AND METHOD OF MANUFACTURING THE SAME

(71) Applicant: Samsung Display Co., Ltd., Yongin-si (KR)

(72) Inventors: Jahun Koo, Asan-si (KR); Jinho Park, Suwon-si (KR); Kyung-hun Lee, Yongin-si (KR); Ho Lee, Seongnam-si (KR); Tae-Jong Jun, Suwon-si (KR); Woo-young Cheon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/430,593

(22) Filed: Jun. 4, 2019

(65) Prior Publication Data

US 2019/0377226 A1    Dec. 12, 2019

(30) Foreign Application Priority Data

Jun. 12, 2018  (KR) .......................... 10-2018-0067312

(51) Int. Cl.
  *G02F 1/13357*  (2006.01)
  *G02F 1/1335*   (2006.01)

(52) U.S. Cl.
  CPC .. *G02F 1/133606* (2013.01); *G02F 1/133504* (2013.01); *G02F 1/133514* (2013.01); *G02F 1/133611* (2013.01)

(58) Field of Classification Search
  None
  See application file for complete search history.

(56) References Cited

U.S. PATENT DOCUMENTS

| | | | | |
|---|---|---|---|---|
| 2005/0275766 | A1* | 12/2005 | Liu | G02F 1/133611 349/64 |
| 2006/0285352 | A1* | 12/2006 | Kim | G02B 6/0051 362/558 |
| 2009/0207339 | A1* | 8/2009 | Ajichi | G02B 6/0068 349/64 |
| 2009/0279175 | A1* | 11/2009 | Laney | G02B 5/0263 359/599 |
| 2011/0024928 | A1* | 2/2011 | Laney | B32B 23/08 264/1.31 |

(Continued)

FOREIGN PATENT DOCUMENTS

| KR | 10-2005-0040020 | 5/2005 |
|---|---|---|
| KR | 10-0717319 | 5/2007 |

(Continued)

*Primary Examiner* — Ryan Crockett
(74) *Attorney, Agent, or Firm* — H.C. Park & Associates, PLC

(57) ABSTRACT

A display apparatus includes a light source unit configured to output light, a display panel configured to display an image and including a first substrate, a second substrate facing the first substrate, and a liquid crystal layer disposed between the first substrate and the second substrate, and a diffusion layer provided between the light source unit and the display panel and including scatterers for scattering the light supplied from the light source unit. The diffusion layer has a first concentration area in which the scatterers are provided at a first concentration, and a second concentration area in which the scatterers are provided at a second concentration.

7 Claims, 11 Drawing Sheets

(56) References Cited

U.S. PATENT DOCUMENTS

| | | | |
|---|---|---|---|
| 2011/0025948 A1* | 2/2011 | Laney | G02B 5/0257 |
| | | | 349/64 |
| 2012/0113672 A1* | 5/2012 | Dubrow | G02B 6/0068 |
| | | | 362/602 |
| 2016/0093677 A1* | 3/2016 | Tseng | G02B 5/22 |
| | | | 362/84 |
| 2016/0195769 A1* | 7/2016 | Kim | G02F 1/133603 |
| | | | 349/58 |
| 2018/0059482 A1* | 3/2018 | Li | G02F 1/133509 |
| 2018/0149872 A1* | 5/2018 | Choi | G02B 5/0242 |
| 2019/0353975 A1* | 11/2019 | Didomenico | G02B 1/06 |

FOREIGN PATENT DOCUMENTS

| | | |
|---|---|---|
| KR | 10-2015-0004473 | 1/2015 |
| KR | 10-1530773 | 6/2015 |
| KR | 10-2017-0080313 | 7/2017 |

* cited by examiner

DISPLAY APPARATUS AND METHOD OF MANUFACTURING THE SAME

CROSS-REFERENCE TO RELATED APPLICATION

This application claims priority from and the benefit of Korean Patent Application No. 10-2018-0067312, filed on Jun. 12, 2018, which is hereby incorporated by reference for all purposes as if fully set forth herein.

BACKGROUND

Field

Exemplary embodiments of the invention relate generally to a display apparatus and a method of manufacturing the same and, more specifically, to a display apparatus with improved optical characteristics and a method of manufacturing the same.

Discussion of the Background

Various kinds of display apparatuses are used to provide image information. Liquid crystal display apparatuses are used in large-sized display apparatuses and portable display apparatuses because of their low power consumption characteristics. Meanwhile, in a direct type structure, various kinds of optical members are added to a display apparatus to increase brightness uniformity of light outputted from a backlight unit.

Recently, display apparatuses having thin thicknesses as well as excellent optical characteristics have been increasingly demanded. However, when various optical members are added to improve display quality of a liquid crystal display apparatus, a total thickness of the liquid crystal display apparatus may be increased.

The above information disclosed in this Background section is only for understanding of the background of the inventive concepts, and, therefore, it may contain information that does not constitute prior art.

SUMMARY

Display apparatus constructed according to exemplary embodiments of the invention are capable of improving brightness uniformity while inhibiting or preventing a decrease in brightness and an increase in thickness.

Exemplary embodiments of the invention may also provide a method of manufacturing the display apparatus.

Additional features of the inventive concepts will be set forth in the description which follows, and in part will be apparent from the description, or may be learned by practice of the inventive concepts.

In an embodiment of the inventive concepts, a display apparatus includes a light source unit configured to output light, a display panel that is configured to display an image and includes a first substrate, a second substrate facing the first substrate, and a liquid crystal layer disposed between the first substrate and the second substrate, and a diffusion layer that is provided between the light source unit and the display panel and includes scatterers for scattering the light supplied from the light source unit. The diffusion layer has a first concentration area in which the scatterers are provided at a first concentration, and a second concentration area in which the scatterers are provided at a second concentration.

In an exemplary embodiment, the light source unit may include a plurality of light sources configured to generate the light and spaced apart from each other at predetermined distances. The plurality of light sources may be disposed to face a bottom surface of the diffusion layer.

In an exemplary embodiment, the first concentration area may be provided in plurality, and the plurality of first concentration areas may correspond to a plurality of light source areas facing the plurality of light sources, respectively. A width of each of the first concentration areas may be greater than a width of each of the light source areas.

In an exemplary embodiment, the first concentration may be higher than the second concentration.

In an exemplary embodiment, the light source unit may further include a circuit board, and the plurality of light sources may be mounted on a top surface of the circuit board, which is parallel to the bottom surface of the diffusion layer.

In an exemplary embodiment, the display panel may be disposed on the light source unit so that the first substrate, the liquid crystal layer and the second substrate are sequentially stacked on the light source unit, and the diffusion layer may be provided on a bottom surface of the first substrate.

In an exemplary embodiment, the display panel may be disposed on the light source unit so that the first substrate, the liquid crystal layer and the second substrate are sequentially stacked on the light source unit, and the diffusion layer may be provided on a top surface of the second substrate.

In an exemplary embodiment, the scatterers may include quantum dots, or scattering particles including titanium dioxide.

In an exemplary embodiment of the inventive concepts, a display apparatus includes a light source unit configured to output light, a display panel that is configured to display an image and includes a first substrate, a second substrate facing the first substrate, and a liquid crystal layer disposed between the first substrate and the second substrate, and a diffusion layer that is provided between the light source unit and the display panel and includes scatterers for scattering the light supplied from the light source unit. The diffusion layer includes a first area having a first thickness and a second area having a second thickness.

In an exemplary embodiment, the diffusion layer may include a first diffusion layer formed in the first area, and a second diffusion layer formed in the first area and the second area.

In an exemplary embodiment, the scatterers may be provided at the same concentration in the first diffusion layer and the second diffusion layer.

In an exemplary embodiment, the scatterers may be provided at a first concentration in the first diffusion layer, and the scatterers may be provided at a second concentration in the second diffusion layer.

In an exemplary embodiment, the first concentration may be higher than the second concentration.

In an exemplary embodiment, the light source unit may include a plurality of light sources configured to generate the light and spaced apart from each other at predetermined distances. The plurality of light sources may be disposed to face a bottom surface of the diffusion layer.

In an exemplary embodiment, the first area may be provided in plurality, and the plurality of first areas may correspond to a plurality of light source areas facing the plurality of light sources, respectively. The first thickness may be greater than the second thickness.

In an exemplary embodiment, the display panel may be disposed on the light source unit so that the first substrate, the liquid crystal layer and the second substrate are sequentially stacked on the light source unit, and the diffusion layer may be provided on a bottom surface of the first substrate.

In an exemplary embodiment, the display panel may be disposed on the light source unit so that the first substrate, the liquid crystal layer and the second substrate are sequentially stacked on the light source unit, and the diffusion layer may be provided on a top surface of the second substrate.

In a method of manufacturing a display apparatus according to an exemplary embodiment of the inventive concepts, the manufacturing method includes forming a first diffusion layer, wherein scatterers are provided in the first diffusion layer at a first concentration, on a first area of one surface of a display panel of the display apparatus, and forming a second diffusion layer, wherein scatterers are provided in the second diffusion layer at a second concentration, on a second area of the one surface of the display panel.

In an exemplary embodiment, the first diffusion layer may be provided in plurality, and the plurality of first diffusion layers may correspond to a plurality of light source areas facing a plurality of light sources of the display apparatus, respectively. The first concentration may be higher than the second concentration.

In an exemplary embodiment, the scatterers may include quantum dots, or scattering particles including titanium dioxide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
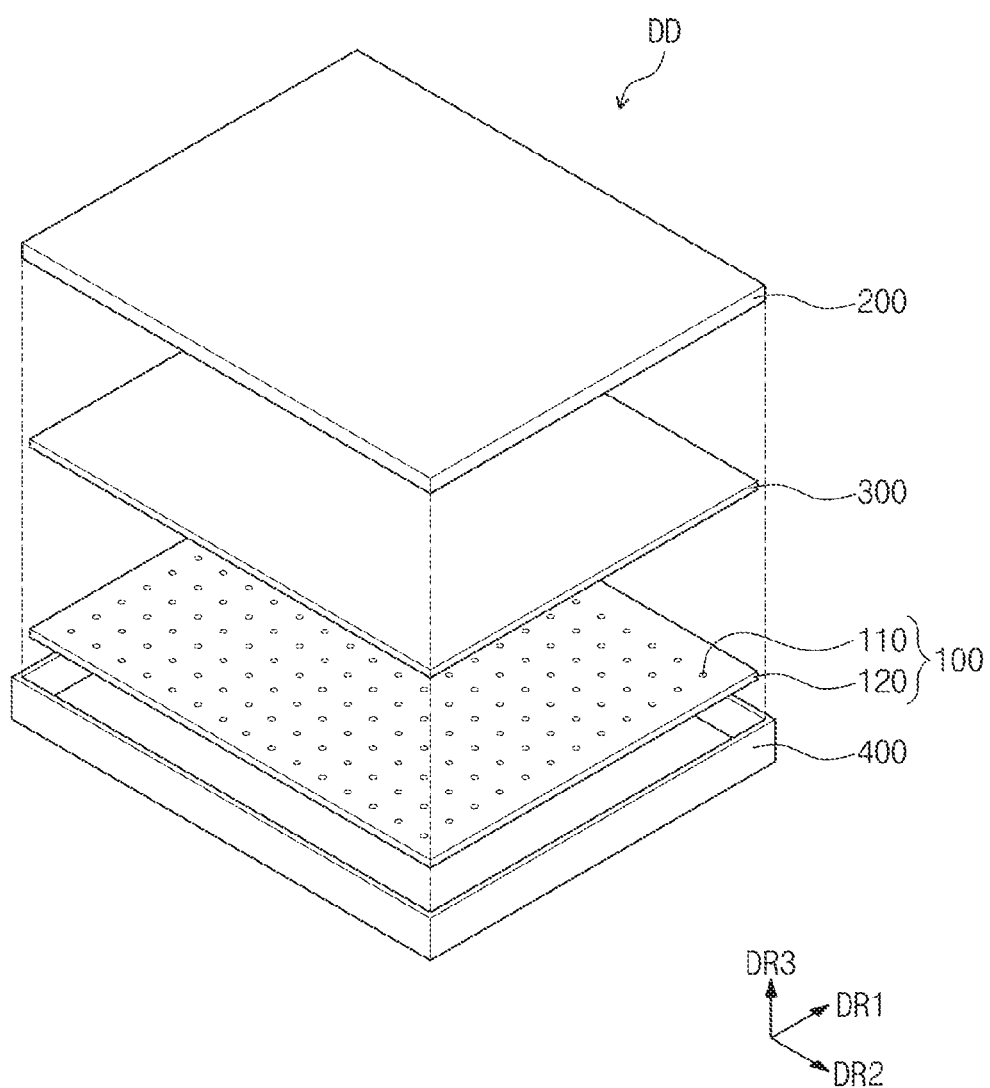
FIG. 1 is a perspective view illustrating a display apparatus according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
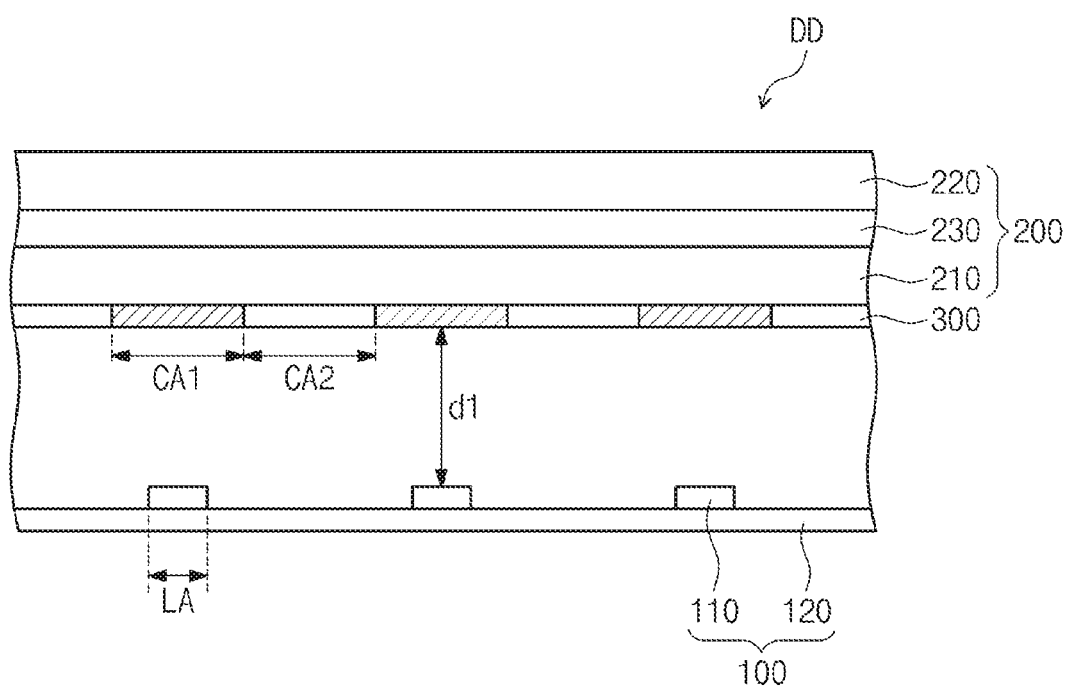
FIG. 2 is a cross-sectional view illustrating a portion of the display apparatus of FIG. 1.

FIG. 1 is a perspective view illustrating a display apparatus according to an exemplary embodiment of the inventive concepts, and FIG. 2 is a cross-sectional view illustrating a portion of the display apparatus of FIG. 1.

Referring to FIGS. 1 and 2, a display apparatus DD according to an exemplary embodiment of the inventive concepts may include a display panel 200 and a light source unit 100 configured to provide light to the display panel 200. The light source unit 100 may be disposed under the display panel 200.

For the purpose of ease and convenience in description, in the display apparatus DD, a direction in which an image is provided may be defined as an upward direction, and a direction opposite to the upward direction may be defined as a downward direction. In the present exemplary embodiment, a display surface of the display panel 200 may be defined by first and second directions DR1 and DR2, and the upward and downward directions may be parallel to a third direction DR3 perpendicular to the first and second directions DR1 and DR2. The third direction DR3 may be a reference direction used to define a front surface and a rear surface of each of components to be described later. However, the upward and downward directions may be relative concepts and may be changed into other directions.

The display panel 200 may display an image by using light provided from the light source unit 100. In other words, the display panel 200 may include a light receiving type display panel. For example, according to an exemplary embodiment of the inventive concepts, the display panel 200 may be a liquid crystal display panel that includes a first substrate 210, a second substrate 220 facing the first substrate 210, and a liquid crystal layer 230 disposed between the first substrate 210 and the second substrate 220. For example, each of the first and second substrates 210 and 220 may be a transparent rigid substrate, a transparent plastic substrate, or a transparent film.

The light source unit 100 may be disposed directly under a bottom surface (e.g., defined as a rear surface of the first substrate 210) of the display panel 200 and may provide light to the display panel 200. According to the present exemplary embodiment, the light source unit 100 may be a direct type light source unit. However, exemplary embodiments of the inventive concepts are not limited thereto. The light source unit 100 according to another exemplary embodiment may be an edge type light source unit.

The light source unit 100 may include a plurality of light sources 110 generating light and spaced apart from each other at predetermined distances, and a circuit board 120 on which the plurality of light sources 110 is mounted. In detail, the plurality of light sources 110 may be mounted on a top surface of the circuit board 120, which is parallel to the bottom surface of the display panel 200. Thus, the plurality of light sources 110 may face the bottom surface of the display panel 200.

For example, each of the plurality of light sources 110 may include a light emitting diode. However, the kind of the light sources 110 according to the inventive concepts is not limited thereto.

The circuit board 120 may include a light source controller connected to the light sources 110. The light source controller may control on/off operations of the light sources 110 and/or may control brightness of light emitted from each of the light sources 110. In another exemplary embodiment, the light source controller may be mounted on a separate circuit board. However, exemplary embodiments of the inventive concepts are not limited to the position of the light source controller.

The display apparatus DD according to an exemplary embodiment of the inventive concepts may further include a receiving container 400 for receiving the light source unit 100. The receiving container 400 may include a bottom portion and a plurality of sidewall portions connected to the bottom portion and may include a space capable of receiving the light source unit 100. The light source unit 100 may be disposed in the space. The receiving container 400 may include a metal material having rigidity.

The display apparatus DD may further include a mold frame for supporting the display panel 200. The mold frame may have a frame shape so as to be coupled to the sidewall portions of the receiving container 400 and may support an edge of the display panel 200.

The display apparatus DD may further include a diffusion layer 300 that is provided between the light source unit 100 and the display panel 200 and includes scatterers for scattering the light supplied from the light source unit 100.

The diffusion layer 300 may include a first concentration area CA1 in which the scatterers are provided at a first concentration, and a second concentration area CA2 in which the scatterers are provided at a second concentration. The first and second concentrations may be different from each other. In particular, the first concentration may be greater than the second concentration. For example, the first concentration area CA1 may be an area in which the scatterers are formed at a concentration of about 30 wt %/3.9 µm, and the second concentration area CA2 may be an area in which the scatterers are formed at a concentration of about 15 wt %/3.9 µm. However, the values of the first and second concentrations are not limited thereto but may be variously changed.

The diffusion layer 300 may be formed on the first substrate 210 included in the display panel 200. In particular, the diffusion layer 300 may be formed on a bottom surface (i.e., the rear surface) of the first substrate 210.

In the present exemplary embodiment, the diffusion layer 300 formed on the bottom surface of the first substrate 210 is illustrated as an example for the purpose of ease and convenience in description. However, in an exemplary embodiment, a polarizing layer and/or another optical layer may be provided between the diffusion layer 300 and the bottom surface of the first substrate 210.

The diffusion layer 300 may be disposed at a position spaced apart from the light sources 110 by a first distance d1. In other words, the first distance d1 may be defined as a separation distance between the diffusion layer 300 and the light sources 110. A difference value between the first concentration in the first concentration area CA1 and the second concentration in the second concentration area CA2 may be changed depending on the first distance d1. In other words, in the event that a difference value between the first and second concentrations is a reference difference value when the first distance d1 is a reference distance, a difference value between the first and second concentrations may be less than the reference difference value when the first distance d1 is greater than the reference distance.

A brightness difference between light provided into the first concentration area CA1 and light provided into the second concentration area CA2 may be changed depending on the first distance d1. For example, when the first distance d1 is 5.1 mm, a brightness at a central point of the first concentration area CA1 may be about 2700 candelas per square meter (cd/m$^2$, also referred to as nits) and a brightness at a central point of the second concentration area CA2 may be about 2500 cd/m$^2$. On the other hand, when the first distance d1 is increased to about 7.6 mm, a brightness at the central point of the first concentration area CA1 may be about 2300 cd/m$^2$, and a brightness at the central point of the second concentration area CA2 may be about 2200 cd/m$^2$. In other words, the brightness difference between the first and second concentration areas CA1 and CA2 may decrease as the first distance d1 increases.

Due to these characteristics, the first concentration of the first concentration area CA1 may be set differently depending on the first distance d1. For example, when the first distance d1 is about 5.1 mm, the scatterers may be formed at a concentration of about 30 wt %/3.9 µm in the first concentration area CA1, and the scatterers may be formed at a concentration of about 15 wt %/3.9 µm in the second concentration area CA2. When the first distance d1 is about 7.6 mm, the scatterers may be formed at a concentration of about 20 wt %/3.9 µm in the first concentration area CA1, and the scatterers may be formed at a concentration of about 15 wt %/3.9 µm in the second concentration area CA2. In other words, a difference in concentration of the scatterers between the first and second concentration areas CA1 and CA2 may be reduced when the first distance d1 is increased.

Since the difference in concentration of the scatterers between the first and second concentration areas CA1 and CA2 is changed depending on the first distance d1 as described above, the brightness difference between the first and second concentration areas CA1 and CA2 may be reduced. In other words, a large amount of light may be scattered in the first concentration area CA1 in which an amount of incident light is high, and a small amount of light may be scattered in the second concentration area CA2 in which an amount of incident light is low. Thus, the brightness difference between the first and second concentration areas CA1 and CA2 may be reduced.

As described above, the display apparatus DD may include the diffusion layer 300 that includes two concentration areas CA1 and CA2 of which the concentrations of the scatterers are different from each other, and thus brightness uniformity of the display apparatus DD may be improved without increasing the first distance d1. As a result, it is possible to inhibit or prevent a total thickness of the display apparatus DD from being increased.

Figure 3:
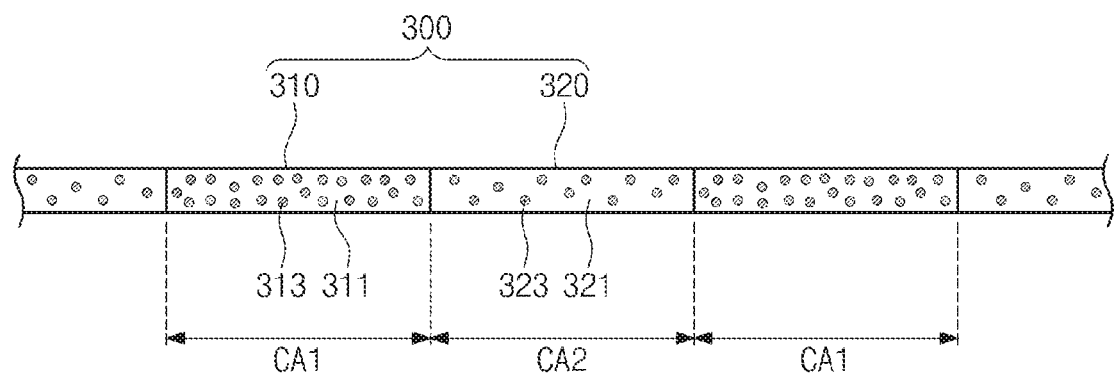
FIG. 3 is an enlarged cross-sectional view illustrating a portion of a diffusion layer of FIG. 2.

FIG. 3 is an enlarged cross-sectional view illustrating a portion of a diffusion layer of FIG. 2.

Referring to FIG. 3, the diffusion layer 300 according to an exemplary embodiment of the inventive concepts may include a first diffusion layer 310 and a second diffusion layer 320. The first diffusion layer 310 may be provided in the first concentration area CA1, and the second diffusion layer 320 may be provided in the second concentration area CA2.

The first diffusion layer 310 may include a first base resin 311 and first scatterers 313 dispersed in the first base resin 311, and the second diffusion layer 320 may include a second base resin 321 and second scatterers 323 dispersed in the second base resin 321. The first scatterers 313 may be dispersed at the first concentration in the first base resin 311, and the second scatterers 323 may be dispersed at the second concentration in the second base resin 321.

The first and second base resins 311 and 321 may be formed of at least one of various resin compositions which may be generally referred to as binders. However, exemplary embodiments of the inventive concepts are not limited thereto. The first and second base resins 311 and 321 may be formed of at least one of other mediums capable of dispersing the first and second scatterers 313 and 323, regardless of names, additional functions, and/or materials. In an exemplary embodiment, the first and second base resins 311 and 321 may include a polymer resin. For example, the first and second base resins 311 and 321 may include an acrylic-based resin, a urethane-based resin, a silicon-based resin, or an epoxy-based resin. The first and second base resins 311 and 321 may be a transparent resin.

In an exemplary embodiment, the first and second scatterers 313 and 323 may be formed of the same material. Each of the first and second scatterers 313 and 323 may include a quantum dot. The quantum dot may be a material having a crystal structure having a size of several nanometers and may be composed of hundreds to thousands of atoms. The quantum dot may show a quantum confinement effect in which an energy band gap is increased by the small size. When light of a wavelength corresponding to energy greater than the energy band gap is incident to the quantum dot, the quantum dot may be excited by absorbing the light and then may transition to a ground state while emitting light of a specific wavelength. Energy of the emitted light may correspond to the energy band gap. Light emitting characteristics of the quantum dot by the quantum confinement effect may be adjusted by adjusting the size and/or the composition of the quantum dot.

The quantum dot may have a core-shell structure including a core and a shell surrounding the core. Alternatively, the quantum dot may have a core/shell structure in which one quantum dot surrounds another quantum dot. An interface of the core and the shell may have a concentration gradient in which a concentration of an element existing in the shell becomes progressively less toward a center.

Furthermore, a shape of the quantum dot may be a general shape known in the art but is not limited to a specific shape. For example, the quantum dot may have a spherical shape, a pyramidal shape, a multi-arm shape, a cubic nanoparticle shape, a nanotube shape, a nanowire shape, a nanofiber shape, or a nano-plate particle shape.

For another example, each of the first and second scatterers 313 and 323 may include titanium dioxide ($TiO_2$). In other words, each of the first and second scatterers 313 and 323 may have a particle shape formed of titanium dioxide ($TiO_2$).

Figure 4:
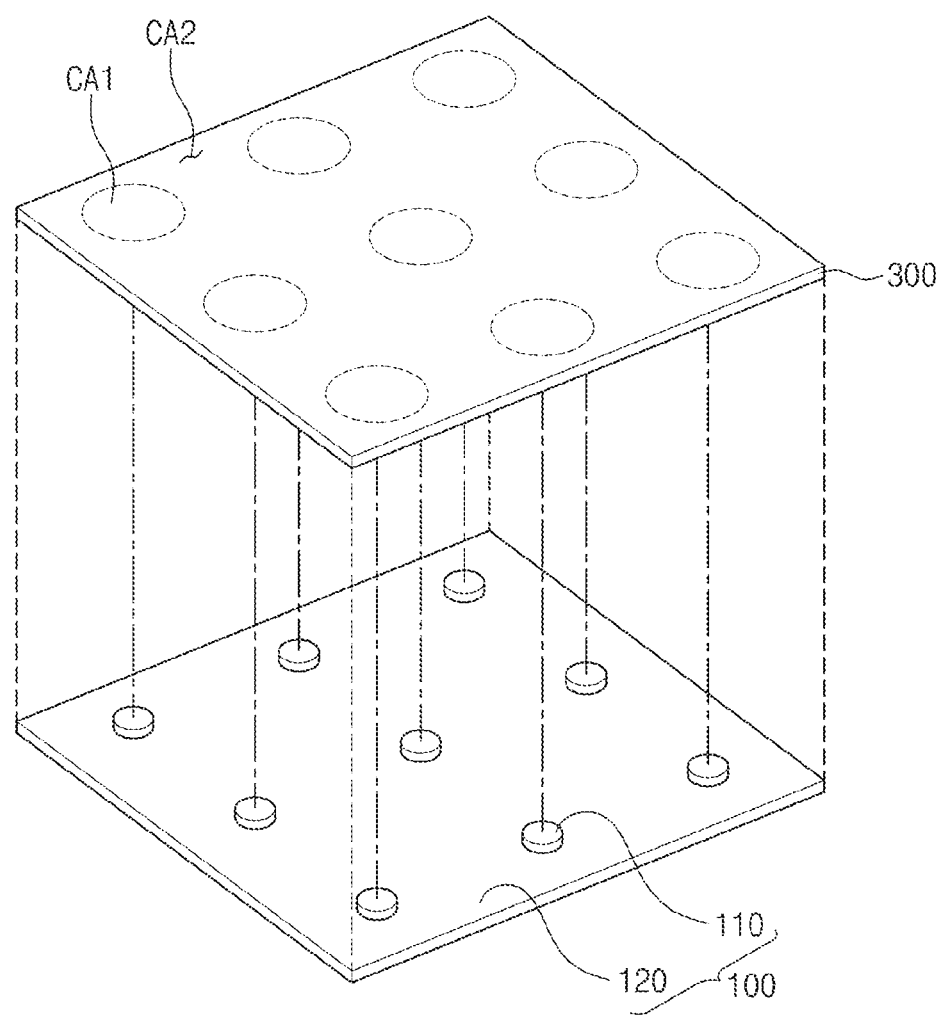
FIG. 4 is a perspective view illustrating corresponding relationship of a light source unit and the diffusion layer of FIG. 2.

FIG. 4 is a perspective view illustrating corresponding relationship of a light source unit and the diffusion layer of FIG. 2.

Referring to FIGS. 2 and 4, the first concentration area CA1 may be provided in plurality, and the plurality of first concentration areas CA1 may correspond to a plurality of light source areas LA facing the plurality of light sources 110, respectively. In an exemplary embodiment, a width of the first concentration area CA1 may be greater than a width of each of the light source areas LA.

Each of the light sources 110 may have a light emitting surface from which the light is emitted, and a shape of the first concentration area CA1 may be changed depending on a shape of the light emitting surface. For example, when the light emitting surface has a circular shape or a hemispheric shape, the first concentration area CA1 may have a circular shape. Alternatively, when the light emitting surface has a rectangular shape or a diamond shape, the first concentration area CA1 may also have a rectangular shape or a diamond shape.

In FIG. 4, the light emitting surface and the first concentration area CA1 which have the circular shapes are illustrated as an example. A center point of each of the light sources 110 and a center point of the first concentration area CA1 corresponding to each of the light sources 110 may be located on the same imaginary line. A diameter of the first concentration area CA1 may be greater than a diameter of the light source area LA.

Figure 5:
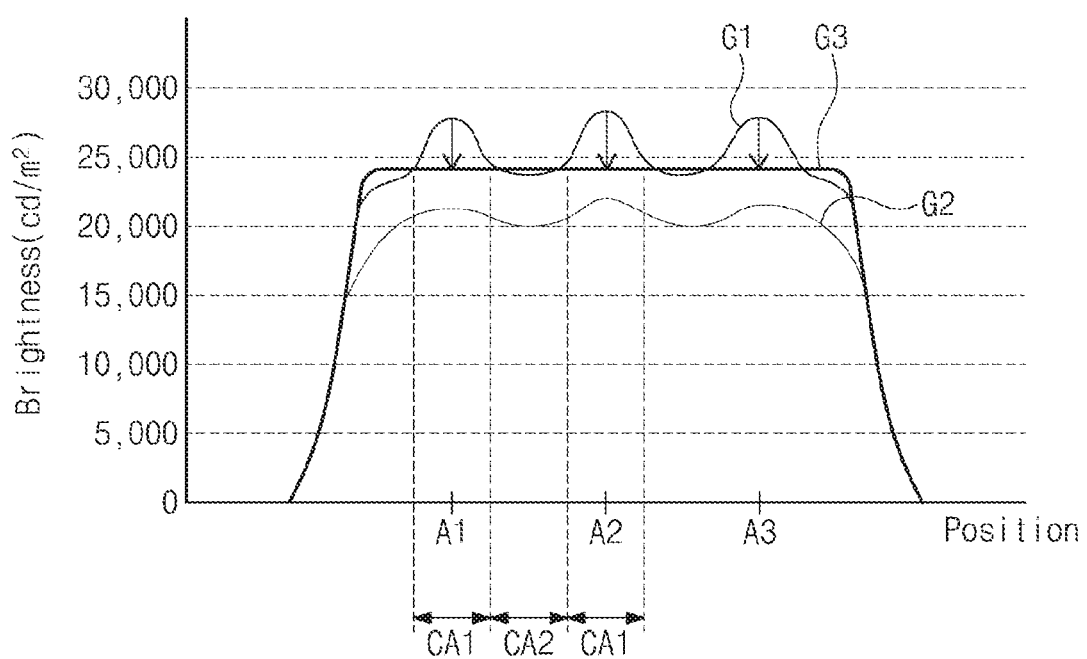
FIG. 5 is a waveform diagram showing a brightness distribution of light transmitted through the diffusion layer of FIG. 3.

FIG. 5 is a waveform diagram showing a brightness distribution of light transmitted through the diffusion layer of FIG. 3. In FIG. 5, a first graph G1 shows a brightness distribution according to a first comparative example in which a first comparative diffusion layer including scatterers of a second concentration is disposed, a second graph G2 shows a brightness distribution according to a second comparative example in which a second comparative diffusion layer including scatterers of a first concentration is disposed, and a third graph G3 shows a brightness distribution according to the exemplary embodiment of the inventive concepts, in which the diffusion layer of FIG. 3 is disposed.

In FIG. 5, an x-axis shows a position of a light source, and a y-axis shows a brightness. A first point A1 is a center point of a first light source of the plurality of light sources, a second point A2 is a center point of a second light source of the plurality of light sources, and a third point A3 is a center point of a third light source of the plurality of light sources.

Referring to FIG. 5, in the case of the first comparative diffusion layer in which the scatterers are provided at the second concentration, the brightness is high at the first to third points A1, A2 and A3 but is low in an area between the first and second points A1 and A2 and an area between the second and third points A2 and A3. In other words, when the first comparative diffusion layer is disposed, a brightness difference is great (e.g., about 4000 cd/m$^2$) as shown in the first graph G1. Thus, total brightness uniformity may be low.

In the case of the second comparative diffusion layer in which the scatterers are provided at the first concentration, the brightness is higher at the first to third points A1, A2 and A3 than in other areas, but a brightness difference is reduced to about 2500 cd/m$^2$ or less, as compared with the first comparative example. However, in the second comparative example, the brightness uniformity is increased but a total brightness is reduced.

On the contrary, as shown in the third graph G3, in the case of the diffusion layer according to the inventive concepts in FIG. 3, the brightness in the first concentration areas CA1 including the first to third points A1 to A3 is lower than that of the first comparative example but the brightness in the second concentration area CA2 is similar to that of the first comparative example.

As a result, the display apparatus DD includes the diffusion layer 300 having the two concentration areas CA1 and CA2 of which the concentrations of the scatterers are different from each other, and thus the brightness uniformity of the display apparatus DD may be improved while minimizing a reduction in total brightness.

FIGS. 6A to 6D are cross-sectional views illustrating a process of forming the diffusion layer of FIG. 3 on a first substrate.

Figure 6A:
FIGS. 6A, 6B, 6C, and 6D are cross-sectional views illustrating a process of forming the diffusion layer of FIG. 3 on a first substrate.

Referring to FIG. 6A, a first diffusion material layer 301 may be formed on a bottom surface LS of a first substrate 210. Here, the bottom surface LS of the first substrate 210 may be a rear surface of the display panel 200 illustrated in FIG. 2. The first diffusion material layer 301 may include first scatterers 313 dispersed at a first concentration and may be deposited on an entire portion of the bottom surface LS of the first substrate 210.

Figure 6B:
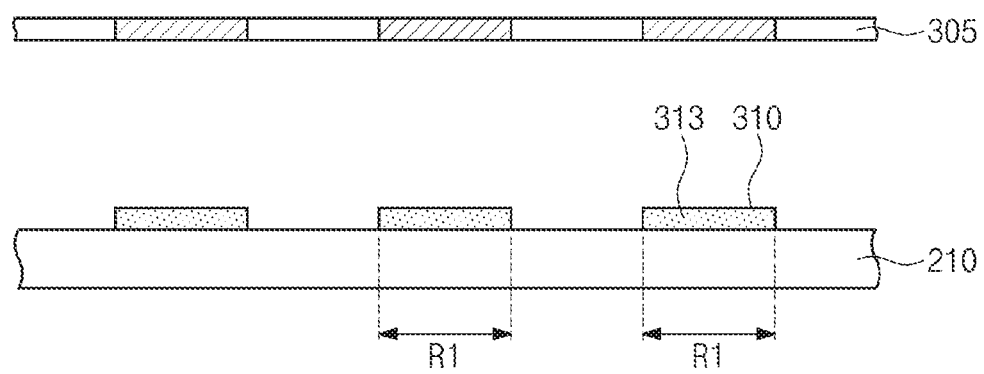

Referring to FIG. 6B, a patterning process may be performed to leave the first diffusion material layer 301 on a first area R1 of the first substrate 210 but to remove the first diffusion material layer 301 from the other area of the first substrate 210. A first mask 305 may be used in the patterning process. A pattern corresponding to the first area R1 may be formed in the first mask 305. A shape of the pattern formed in the first mask 305 may be changed depending on a type of the patterning process and/or a material used in the patterning process. The first diffusion layer 310 may be formed on the first area R1 of the first substrate 210 by the patterning process using the first mask 305.

Figure 6C:
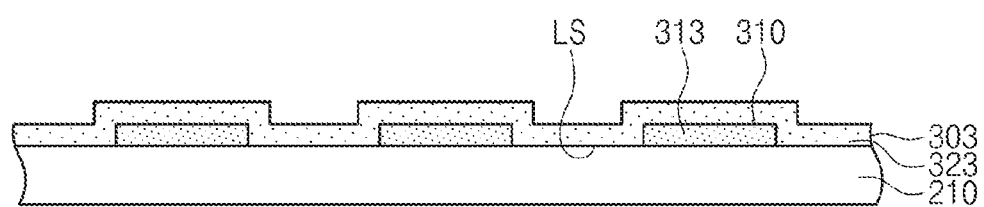

Referring to FIG. 6C, a second diffusion material layer 303 may be formed on the bottom surface LS of the first substrate 210 to cover the first diffusion layer 310. The second diffusion material layer 303 may include second scatterers 323 dispersed at a second concentration.

Figure 6D:
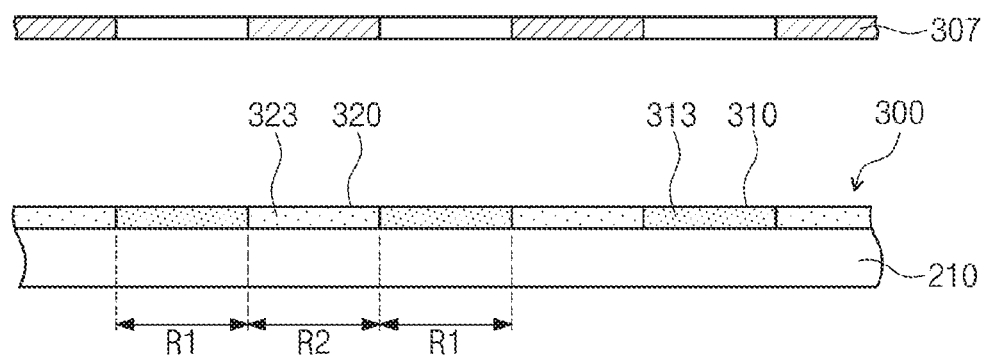

As illustrated in FIG. 6D, a patterning process may be performed to leave the second diffusion material layer 303 on a second area R2 of the first substrate 210 but to remove the second diffusion material layer 303 from the first area R1. A second mask 307 may be used in the patterning process. A pattern corresponding to the second area R2 may be formed in the second mask 307. A shape of the pattern formed in the second mask 307 may be changed depending on a type of the patterning process and/or a material used in the patterning process. The second diffusion layer 320 may be formed on the second area R2 of the first substrate 210 by the patterning process using the second mask 307.

Here, the first area R1 on which the first diffusion layer 310 is formed may correspond to the first concentration area CA1 of the diffusion layer 300 illustrated in FIG. 2, and the second area R2 on which the second diffusion layer 320 is formed may correspond to the second concentration area CA2 of the diffusion layer 300 illustrated in FIG. 2. Thus, the diffusion layer 300 illustrated in FIG. 2 may be formed through these processes.

Figure 7:
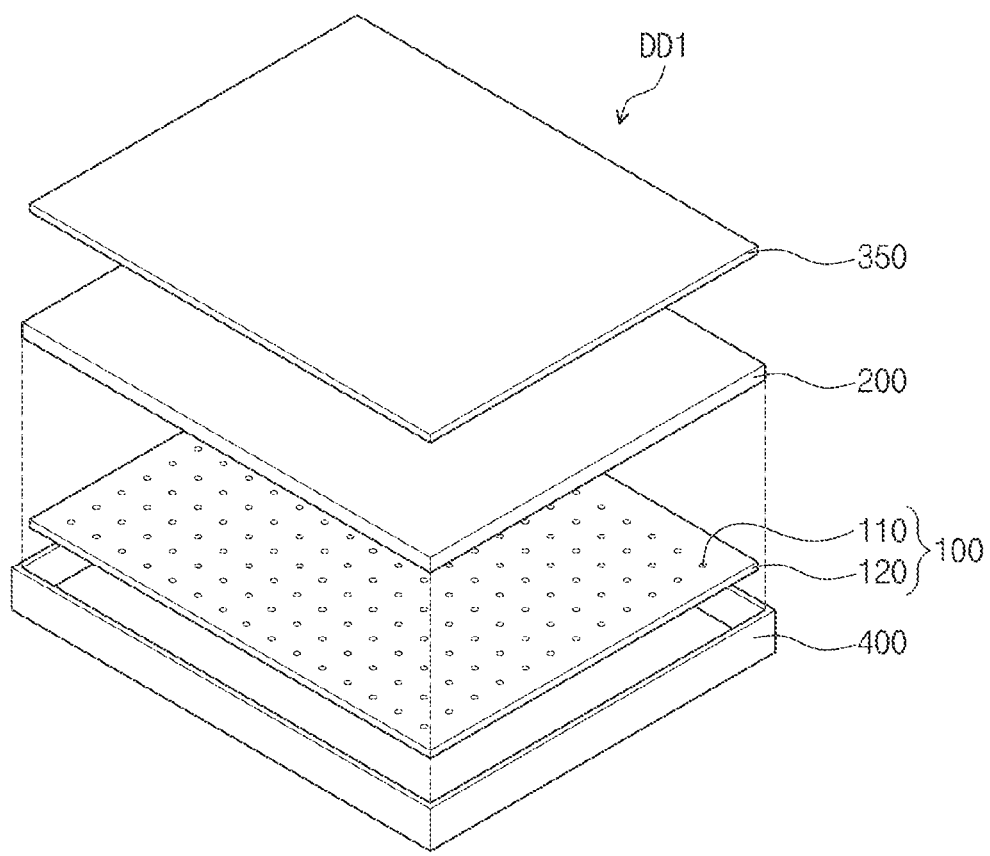
FIG. 7 is a perspective view illustrating a display apparatus according to an exemplary embodiment.
Figure 8:
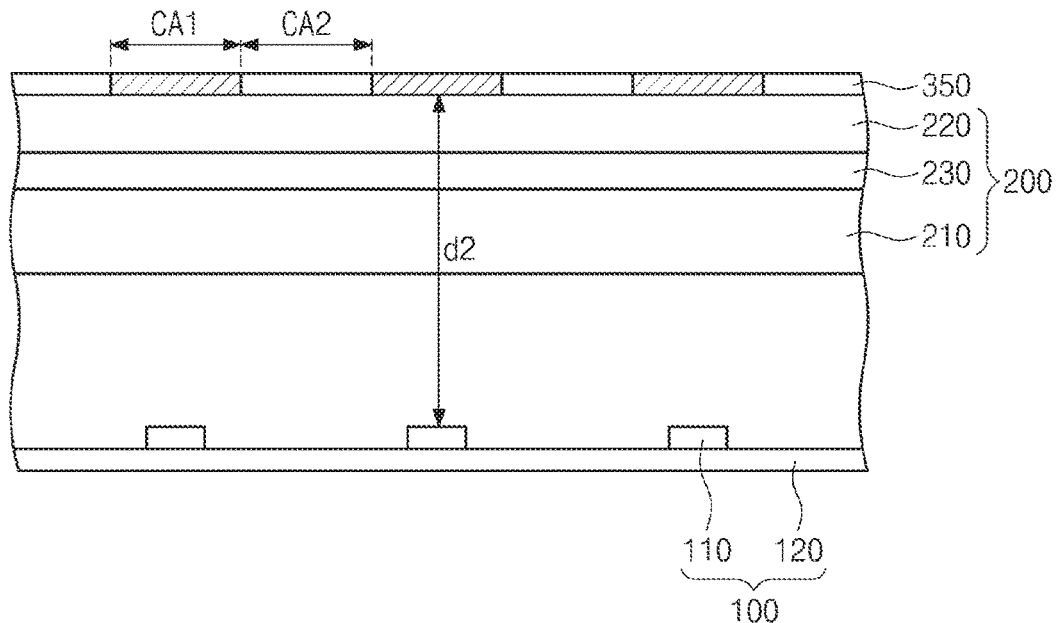
FIG. 8 is a cross-sectional view illustrating a portion of the display apparatus of FIG. 7.

FIG. 7 is a perspective view illustrating a display apparatus according to an exemplary embodiment of the inventive concepts, and FIG. 8 is a cross-sectional view illustrating a portion of the display apparatus of FIG. 7. In the exemplary embodiment of FIGS. 7 and 8, the same components as in the exemplary embodiment of FIGS. 1 and 2 will be indicated by the same reference numerals or designators, and the descriptions thereto will be omitted.

Referring to FIGS. 7 and 8, a display apparatus DD1 according to an exemplary embodiment of the inventive concepts may include a diffusion layer 350 provided on the display panel 200. The diffusion layer 300 of FIG. 1 may be disposed between the display panel 200 and the light source unit 100, but the diffusion layer 350 of FIG. 7 may be disposed on a top surface of the display panel 200. In particular, the diffusion layer 350 may be disposed on a top surface of the second substrate 220 of the first and second substrates 210 and 220 included in the display panel 200.

In the present exemplary embodiment, the diffusion layer 350 formed on the top surface of the second substrate 220 is illustrated as an example for the purpose of ease and convenience in description. However, in an exemplary embodiment, a polarizing layer and/or another optical layer may be provided between the diffusion layer 350 and the top surface of the second substrate 220.

The diffusion layer 350 may include a first concentration area CA1 in which scatterers are provided at a first concentration, and a second concentration area CA2 in which the scatterers are provided at a second concentration. The diffusion layer 350 may be spaced apart from the light source 110 by a second distance d2. The second distance d2 may be greater than the first distance d1 illustrated in FIG. 2. A width of the first concentration area CA1 may be changed depending on a separation distance between the light source 110 and the diffusion layer 350. In other words, the width of the first concentration area CA1 may increase when the separation distance increases. When the separation distance increases from the first distance d1 to the second distance d2, the width of the first concentration area CA1 of FIG. 2 may be greater than the width of the first concentration area CA1 of FIG. 8.

The position of the diffusion layer 350 may be different from the position of the diffusion layer 300 of FIG. 2, but a structure and a function of the diffusion layer 350 may be the same or similar as those of the diffusion layer 300 of FIG. 2. Thus, the descriptions to the structure and the function of the diffusion layer 350 are omitted.

Figure 9:
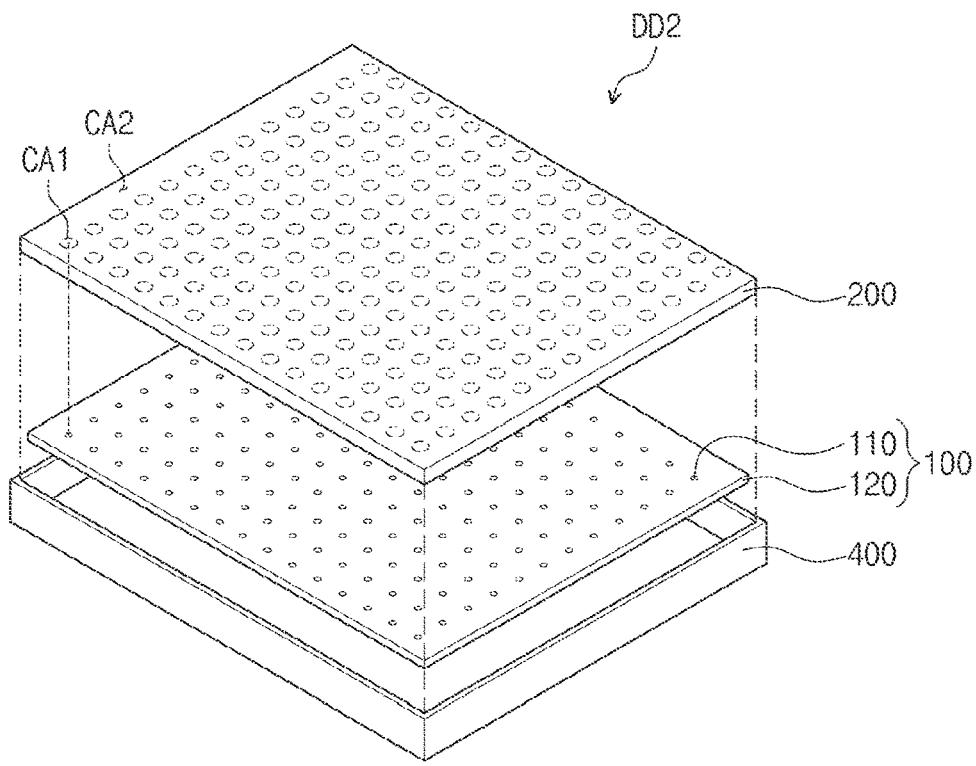
FIG. 9 is a perspective view illustrating a display apparatus according to an exemplary embodiment.
Figure 10:
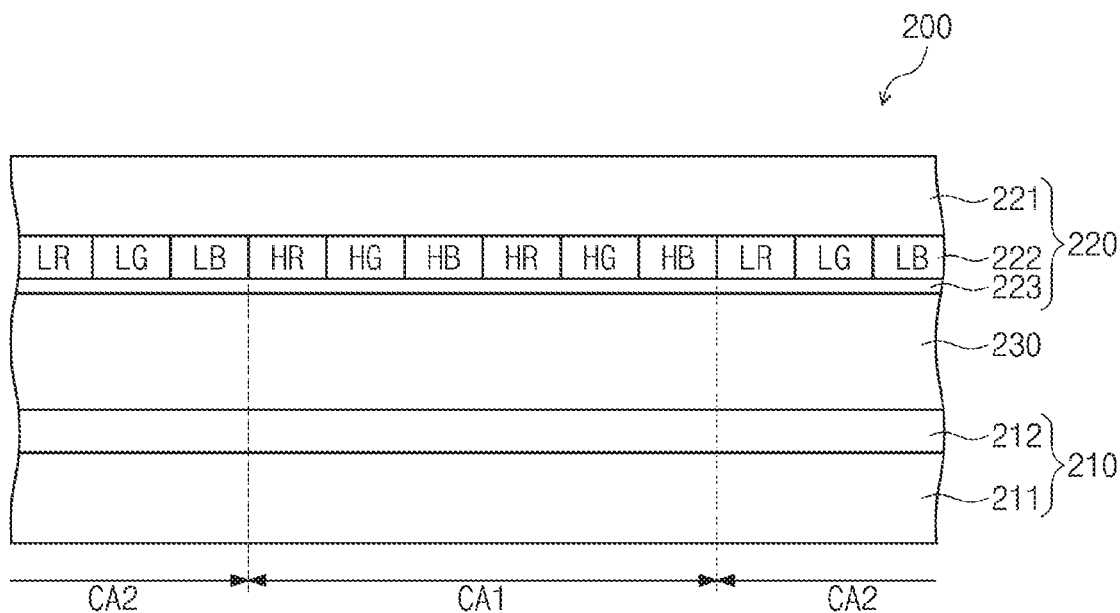
FIG. 10 is a cross-sectional view illustrating a portion of a display panel of FIG. 9.
Figure 11:
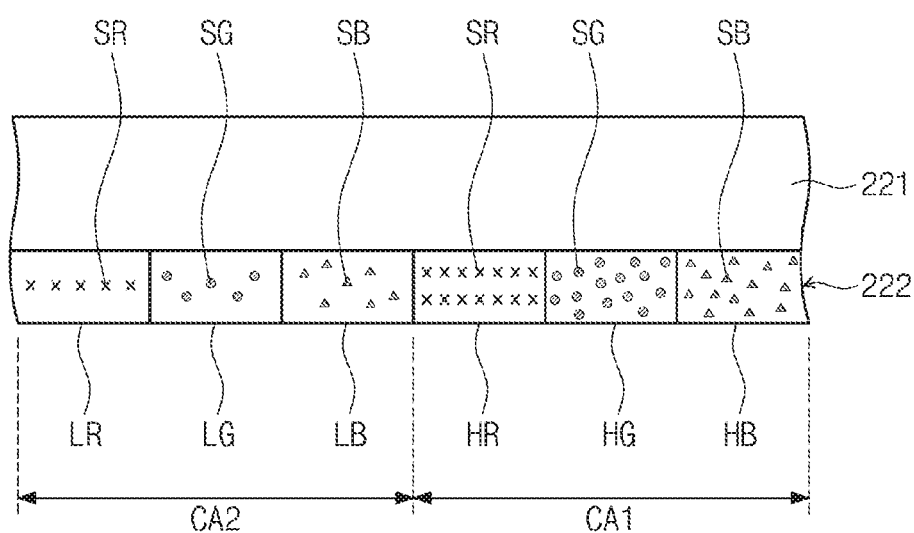
FIG. 11 is an enlarged cross-sectional view illustrating a portion of a color filter layer of FIG. 10.

FIG. 9 is a perspective view illustrating a display apparatus according to an exemplary embodiment of the inventive concepts, FIG. 10 is a cross-sectional view illustrating a portion of a display panel of FIG. 9, and FIG. 11 is an enlarged cross-sectional view illustrating a portion of a color filter layer of FIG. 10. In the exemplary embodiment of FIGS. 9 and 10, the same components as in the exemplary embodiment of FIGS. 1 and 2 will be indicated by the same reference numerals or designators, and the descriptions thereto will be omitted.

Referring to FIGS. 9 to 11, a display apparatus DD2 according to an exemplary embodiment of the inventive concepts may include a diffusion layer provided in the display panel 200. The diffusion layer may be formed as a separate layer between the first and second substrates 210 and 220 in the display panel 200. However, exemplary embodiments of the inventive concepts are not limited thereto. In another exemplary embodiment, scatterers may be formed in a layer included in the display panel 200, and the layer including the scatterers may function as the diffusion layer. For example, the scatterers may be added into a color filter layer in FIGS. 10 and 11, and the color filter layer including the scatterers may function as the diffusion layer.

Referring to FIGS. 10 and 11, the first substrate 210 may include a first base substrate 211 and a pixel array layer 212 provided on the first base substrate 211. The pixel array layer 212 may include a plurality of pixels, and each of the pixels may include a thin film transistor and a pixel electrode. The pixel array layer 212 may further include an insulating layer for electrical insulation and an organic layer for planarization.

The second substrate 220 may include a second base substrate 221, a color filter layer 222, and a common electrode 223. The second base substrate 221 may face the first base substrate 211, and the color filter layer 222 and the common electrode 223 may be sequentially formed on the second base substrate 221. The second substrate 220 may further include a black matrix layer.

The color filter layer 222 may include a first color filter layer HR, HG and HB disposed in a first concentration area CA1, and a second color filter layer LR, LG and LB disposed in a second concentration area CA2. As illustrated in FIG. 9, the first concentration area CA1 may be provided in plurality, and the plurality of first concentration areas CA1 may correspond to a plurality of light source areas LA (see FIG. 2) facing the plurality of light sources 110, respectively. In an exemplary embodiment, a width of the first concentration area CA1 may be greater than a width of each of the light source areas LA.

The first color filter layer HR, HG and HB may include a first red color filter HR, a first green color filter HG, and a first blue color filter HB. Each of the first red color filter HR, the first green color filter HG and the first blue color filter HB may include scatterers. In particular, the scatterers may be provided at a first concentration in each of the first red color filter HR, the first green color filter HG, and the first blue color filter HB.

The second color filter layer LR, LG and LB may include a second red color filter LR, a second green color filter LG, and a second blue color filter LB. Each of the second red color filter LR, the second green color filter LG and the second blue color filter LB may include scatterers. In particular, the scatterers may be provided at a second concentration in each of the second red color filter LR, the second green color filter LG, and the second blue color filter LB.

As illustrated in FIG. 11, different scatterers may be provided in the color filters having different colors. For example, first scatterers SR may be provided in the first and second red color filters HR and LR, second scatterers SG may be provided in the first and second green color filters HG and LG, and third scatterers SB may be provided in the first and second blue color filters HB and LB. The first scatterers SR may be provided at the first concentration in the first red color filter HR, and the first scatterers SR may be provided at the second concentration in the second red color filter LR.

According to the exemplary embodiment of the inventive concepts, the color filter layer 222 may have a function of scattering light provided from the light source unit 100. The scatterers of the first red, green and blue color filters HR, HG and HB in the first concentration area CA1 may be more than those of the second red, green and blue color filters LR, LG and LB in the second concentration area CA2, and thus the first red, green and blue color filters HR, HG and HB may scatter a large amount of light. On the contrary, the scatterers of the second red, green and blue color filters LR, LG and LB in the second concentration area CA2 may be less than those of the first red, green and blue color filters HR, HG and HB in the first concentration area CA1, and thus the second red, green and blue color filters LR, LG and LB may scatter a small amount of light.

Thus, the large amount of light may be scattered in the first concentration area CA1 in which an amount of incident light is high, and the small amount of light may be scattered in the second concentration area CA2 in which an amount of incident light is low. As a result, a brightness difference between the first and second concentration areas CA1 and CA2 may be reduced, and thus total brightness uniformity of the display apparatus may be improved.

Figure 12:
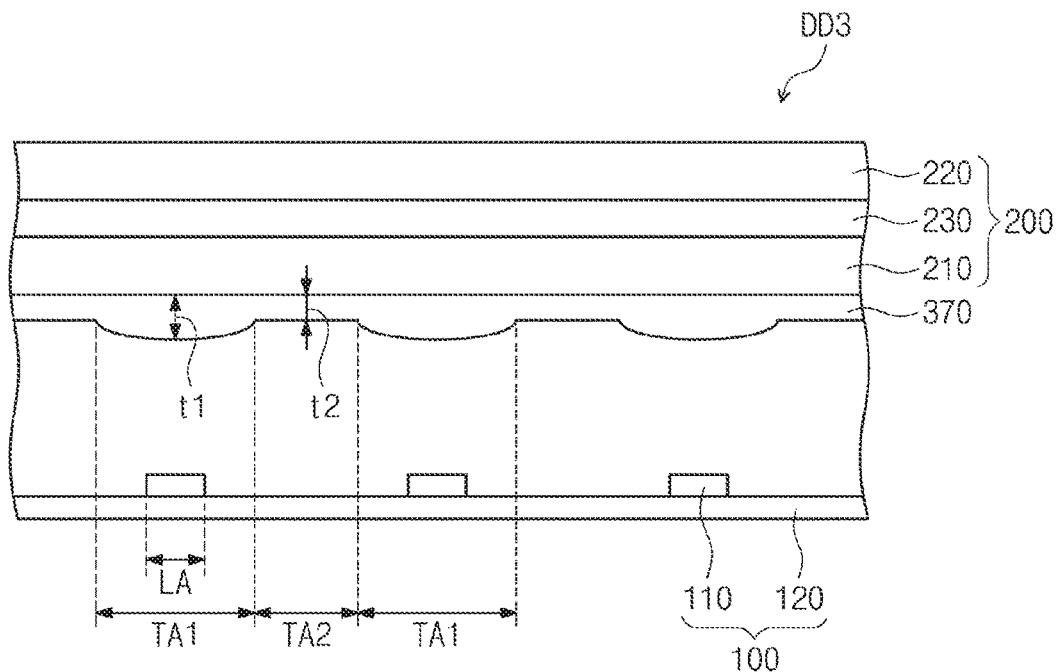
FIG. 12 is a cross-sectional view illustrating a portion of a display apparatus according to an exemplary embodiment.
Figure 13:
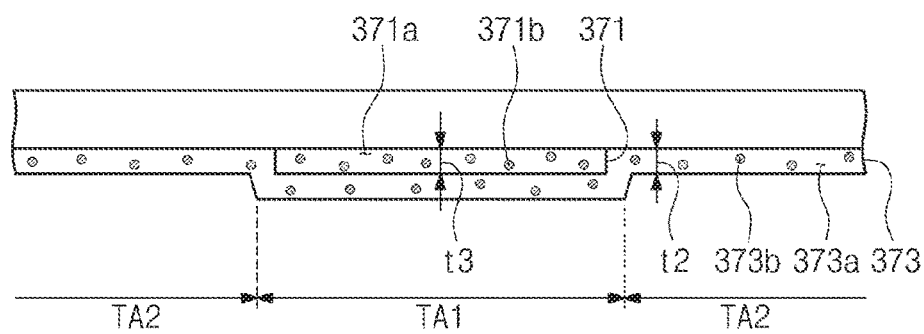
FIG. 13 is an enlarged cross-sectional view illustrating a portion of a diffusion layer of FIG. 12.

FIG. 12 is a cross-sectional view illustrating a portion of a display apparatus according to an exemplary embodiment of the inventive concepts, and FIG. 13 is an enlarged cross-sectional view illustrating a portion of a diffusion layer of FIG. 12. In the exemplary embodiment of FIGS. 12 and 13, the same components as in the exemplary embodiment of FIGS. 1 and 2 will be indicated by the same reference numerals or designators, and the descriptions thereto will be omitted.

Referring to FIG. 12, a display apparatus DD3 according to an exemplary embodiment of the inventive concepts may include a diffusion layer 370 having different thicknesses in different areas. In detail, the diffusion layer 370 may have a first thickness t1 in a first area TA1 and may have a second thickness t2 less than the first thickness t1 in a second area TA2.

The first area TA1 may include a light source area LA corresponding to the light source 110. In an exemplary embodiment, a width of the first area TA1 may be greater than a width of the light source area LA. The first and second areas TA1 and TA2 may correspond to the first and second concentration areas CA1 and CA2 defined in FIGS. 1 to 11, respectively, and shapes of the first and second areas TA1 and TA2 may be similar to the shapes of the first and second concentration areas CA1 and CA2. Thus, the descriptions to the shapes and sizes of the first and second areas TA1 and TA2 are omitted.

The diffusion layer 370 may have one or more thicknesses in the first area TA1. The thickness of the diffusion layer 370 in the first area TA1 may become progressively less toward the second area TA2 from a point corresponding to a center point of the light source 110. The diffusion layer 370 may have a uniform thickness in the second area TA2.

However, the structure of the diffusion layer 370 is not limited thereto. The structure of the diffusion layer 370 may be variously modified under the condition that the thickness in the first area TA1 is greater than the thickness in the second area TA2.

Referring to FIGS. 12 and 13, the diffusion layer 370 may include a first diffusion layer 371 and a second diffusion layer 373. The first diffusion layer 371 may be provided in the first area TA1, and the second diffusion layer 373 may be provided in both the first and second areas TA1 and TA2. Thus, the diffusion layer 370 may have the first thickness t1 by the first and second diffusion layers 371 and 373 in the first area TA1, and the diffusion layer 370 may have the second thickness t2 by the second diffusion layer 373 in the second area TA2. When the first diffusion layer 371 has a third thickness t3, the first thickness t1 of the diffusion layer 370 in the first area TA1 may correspond to a sum of the second and third thicknesses t2 and t3.

The first diffusion layer 371 may include a first base resin 371a and first scatterers 371b dispersed in the first base resin 371a, and the second diffusion layer 373 may include a second base resin 373a and second scatterers 373b dispersed in the second base resin 373a. The first and second base resins 371a and 373a may be formed of at least one of various resin compositions which may be generally referred to as binders. However, exemplary embodiments of the inventive concepts are not limited thereto. The first and second base resins 371a and 373a may be formed of at least one of other mediums capable of dispersing the first and second scatterers 371b and 373b, regardless of names, additional functions, and/or materials. In an exemplary embodiment, the first and second base resins 371a and 373a may include a transparent polymer resin.

In an exemplary embodiment, the first and second scatterers 371b and 373b may be formed of the same material. Each of the first and second scatterers 371b and 373b may include a quantum dot. In another exemplary embodiment, each of the first and second scatterers 371b and 373b may have a particle shape formed of titanium dioxide ($TiO_2$).

A concentration of the first scatterers 371b provided in the first diffusion layer 371 may be equal to a concentration of the second scatterers 373b provided in the second diffusion layer 373. Even though the first and second scatterers 371b and 373b are provided at the same concentration, the first and second diffusion layers 371 and 373 may be stacked in the first area TA1, and thus the number of total scatterers in a unit area in the first area TA1 may be more than the number of total scatterers in the unit area in the second area TA2.

In addition, the first diffusion layer 371 and the second diffusion layer 373 may have different thicknesses from each other. When the thickness of the first diffusion layer 371 is increased, the number of the scatterers in the unit area in the first area TA1 may be increased, and thus a scattering effect may be further increased.

Thus, a large amount of light may be scattered in the first area TA1 in which an incident amount of light is high, and a small amount of light may be scattered in the second area TA2 in which an incident amount of light is low. As a result, a brightness difference between the first and second areas TA1 and TA2 may be reduced, and thus total brightness uniformity of the display apparatus DD3 may be improved.

Figure 14:
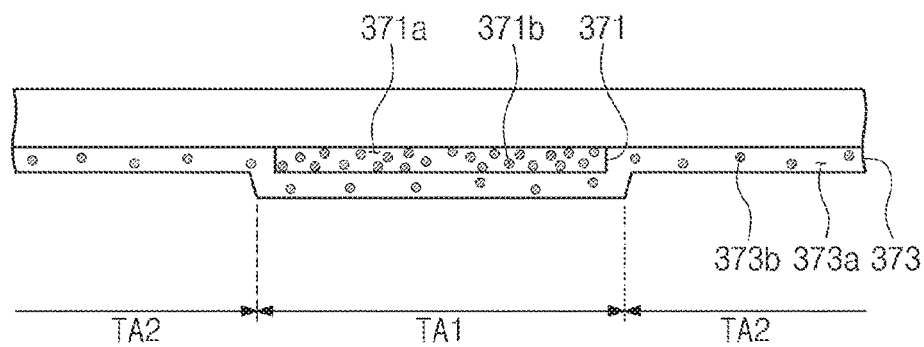
FIG. 14 is an enlarged cross-sectional view illustrating a portion of a diffusion layer according to an exemplary embodiment.

FIG. 14 is an enlarged cross-sectional view illustrating a portion of a diffusion layer according to an exemplary embodiment of the inventive concepts.

Referring to FIG. 14, a concentration of the first scatterers 371b provided in the first diffusion layer 371 may be different from a concentration of the second scatterers 373b provided in the second diffusion layer 373. The concentration of the first scatterers 371b may be higher than the concentration of the second scatterers 373b. In this case, the number of the scatterers in the first area TA1 may be further increased than in the exemplary embodiment shown in FIG. 13.

The concentration of the first scatterers 371b may be adjusted to increase a light scattering effect without increasing the thickness of the first diffusion layer 371.

The diffusion layer 370 having different thicknesses in the first and second areas TA1 and TA2 is provided on the bottom surface of the first substrate 210 in FIGS. 12 to 14. However, exemplary embodiments of the inventive concepts are not limited thereto. In other exemplary embodiments, the diffusion layer 370 may be provided on the top surface of the second substrate 220 as illustrated in FIG. 8 or may be provided in the display panel 200 as illustrated in FIG. 10.

Figure 15A:
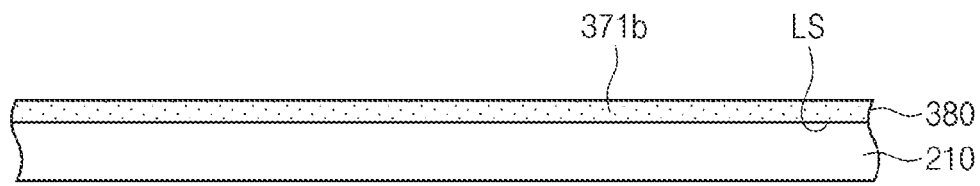
FIGS. 15A, 15B, and 15C are cross-sectional views illustrating a process of forming the diffusion layer of FIG. 13 on a first substrate.
Figure 15B:
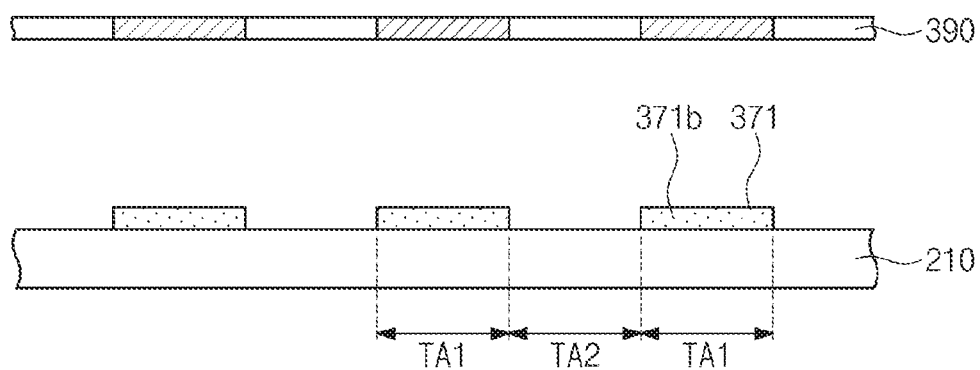
Figure 15C:
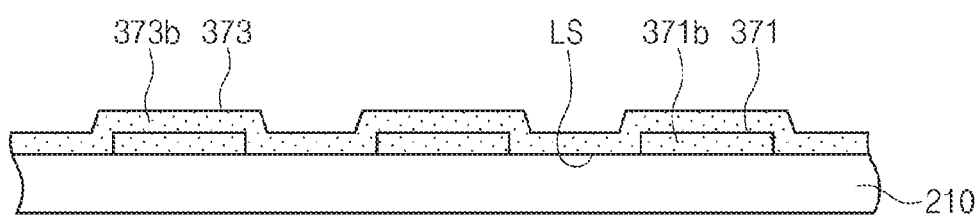

FIGS. 15A to 15C are cross-sectional views illustrating a process of forming the diffusion layer of FIG. 13 on a first substrate.

Referring to FIG. 15A, a first diffusion material layer 380 may be formed on a bottom surface LS of the first substrate 210. Here, the bottom surface LS of the first substrate 210 may be the rear surface of the display panel 200 illustrated in FIG. 12. The first diffusion material layer 380 may include first scatterers 371b and may be deposited on an entire portion of the bottom surface LS of the first substrate 210.

Referring to FIG. 15B, a patterning process may be performed to leave the first diffusion material layer 380 on a first area TA1 of the first substrate 210 but to remove the first diffusion material layer 380 from the other area of the first substrate 210. A first mask 390 may be used in the patterning process. The first diffusion layer 371 may be formed on the first area TA1 of the first substrate 210 by the patterning process using the first mask 390.

Referring to FIG. 15C, a second diffusion layer 373 may be formed on the bottom surface LS of the first substrate 210 to cover the first diffusion layer 371. The second diffusion layer 373 may include second scatterers 373b.

The diffusion layer 370 having the first thickness t1 in the first area TA1 and the second thickness t2 in the second area TA2 as illustrated in FIG. 12 may be formed through these processes. However, the method of forming the diffusion layer 370 is not limited thereto. In another exemplary embodiment, the first diffusion layer 371 may be formed after the second diffusion layer 373 is formed.

In the display apparatus according to the exemplary embodiments of the inventive concepts, the diffusion layer formed at the display panel may include the scatterers provided at different concentrations in different areas or may have different thicknesses in different areas. In particular, the concentration of the scatterers in the diffusion layer of an area corresponding to the light source may be different from the concentration of the scatterers in the diffusion layer of an area not corresponding to the light source, or the thickness of the diffusion layer of the area corresponding to the light source may be different from the thickness of the diffusion layer of the area not corresponding to the light source. Thus, it is possible to reduce a brightness difference between the area corresponding to the light source and the area not corresponding to the light source.

As a result, total brightness uniformity of the display panel may be improved, and a reduction in total brightness or an increase in thickness of the display apparatus may be inhibited or prevented.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display apparatus comprising:
a light generator configured to output light; and
a display panel configured to display an image and comprising a color filter layer,
wherein the color filter layer comprises a first color filter layer disposed on a first concentration area and a second color filter layer disposed on a second concentration area, and wherein:
the first color filter layer comprises first scatterers provided at a first concentration to define the first concentration area,
the second color filter layer comprises second scatterers provided at a second concentration to define the second concentration area, the second concentration being different from the first concentration,
the first color filter layer comprises a first color filter of a first color, and
the second color filter layer comprises a second color filter of the first color.

2. The display apparatus of claim 1, wherein the light generator comprises: a plurality of light sources configured to generate the light and spaced apart from each other at predetermined distances.

3. The display apparatus of claim 2, wherein the first concentration area is provided in plurality, and each of the plurality of first concentration areas correspond to each of a plurality of light source areas facing the plurality of light sources, and
wherein a width of each of the first concentration areas is greater than a width of each of the light source areas.

4. The display apparatus of claim 3, wherein the first concentration is higher than the second concentration.

5. The display apparatus of claim 2, wherein the light generator further comprises a circuit board, and
wherein the plurality of light sources are mounted on a top surface of the circuit board.

6. The display apparatus of claim 1, wherein:
the display panel comprises a first substrate, a second substrate facing the first substrate, and a liquid crystal layer disposed between the first substrate and the second substrate, and
the display panel is disposed on the light generator so that the first substrate, the liquid crystal layer and the second substrate are sequentially stacked on the light generator.

7. The display apparatus of claim 1, wherein the first and second scatterers comprise quantum dots, or scattering particles comprising titanium dioxide.

* * * * *